United States Patent
Sun et al.

(10) Patent No.: US 9,624,939 B2
(45) Date of Patent: Apr. 18, 2017

(54) REFRIGERANT COMPRESSOR MAGNETIC BEARING

(75) Inventors: Lin Sun, Tallahassee, FL (US); Alain Pepin, Tallahassee, FL (US)

(73) Assignee: DANFOSS A/S, Nordborg (DK)

( * ) Notice: Subject to any disclaimer, the term of this patent is extended or adjusted under 35 U.S.C. 154(b) by 1076 days.

(21) Appl. No.: 13/640,771

(22) PCT Filed: Jul. 28, 2010

(86) PCT No.: PCT/US2010/043481
§ 371 (c)(1),
(2), (4) Date: Oct. 12, 2012

(87) PCT Pub. No.: WO2012/015398
PCT Pub. Date: Feb. 2, 2012

(65) Prior Publication Data
US 2013/0039786 A1 Feb. 14, 2013

(51) Int. Cl.
| | | |
|---|---|---|
| *H02K 7/09* | (2006.01) | |
| *F04B 35/04* | (2006.01) | |
| *F04D 29/048* | (2006.01) | |
| *F04D 25/06* | (2006.01) | |
| *F04D 13/06* | (2006.01) | |
| *F04D 29/058* | (2006.01) | |
| *H02K 5/124* | (2006.01) | |

(Continued)

(52) U.S. Cl.
CPC ....... *F04D 29/048* (2013.01); *F04D 13/0633* (2013.01); *F04D 25/062* (2013.01);
(Continued)

(58) Field of Classification Search
CPC .... F04D 25/0606; F04D 29/058; F04D 29/04; F04D 13/0633; F04D 25/062;
(Continued)

(56) References Cited

U.S. PATENT DOCUMENTS

| | | | |
|---|---|---|---|
| 3,334,255 A | 8/1967 | Peters | |
| 5,095,237 A * | 3/1992 | Bardas | ................ F16C 32/0459 310/181 |

(Continued)

OTHER PUBLICATIONS

International Search Report for PCT Application No. PCT/US2010/043481, Sep. 16, 2010.

(Continued)

*Primary Examiner* — Dominick L Plakkoottam
(74) *Attorney, Agent, or Firm* — Carlson, Gaskey & Olds, P.C.

(57) ABSTRACT

A magnetic bearing assembly includes a lamination stack with coil apertures extending between opposing sides. A continuous unitary insulation layer is overmolded onto the opposing sides and within the coil apertures providing a coil aperture lining. The insulation layer includes a wall within the coil aperture adjoining coil aperture lining and bisecting the coil aperture into first and second openings. A coil portion is disposed in each of the first and second openings and electrically isolated from one another by the wall. The magnetic bearing assembly is arranged in a refrigerant compressor that includes an electric motor rotationally configured to rotationally drive an impeller via a shaft. A controller is in communication with the magnetic bearing and configured to energize the coils and provide a magnetic field rotationally supporting the shaft.

17 Claims, 3 Drawing Sheets

(51) Int. Cl.
    *F16C 32/04*     (2006.01)
    *F04D 29/046*    (2006.01)
    *H02K 3/32*      (2006.01)
    *H02K 3/52*      (2006.01)

(52) U.S. Cl.
    CPC ....... F04D 25/0606 (2013.01); F04D 29/058 (2013.01); F16C 32/048 (2013.01); F16C 32/0461 (2013.01); H02K 5/124 (2013.01); H02K 7/09 (2013.01); *F04D 29/046* (2013.01); *F16C 2360/44* (2013.01); *H02K 3/325* (2013.01); *H02K 3/522* (2013.01)

(58) Field of Classification Search
    CPC .... F04D 29/046; F04D 29/056; F04D 29/048; F16C 2360/44; F16C 32/0461; F16C 32/048; H02K 3/325; H02K 3/522; H02K 5/124; H02K 7/09; F25B 1/00; F25B 2313/00
    USPC ......................................... 417/423.12; 62/498
    See application file for complete search history.

(56) References Cited

U.S. PATENT DOCUMENTS

| | | |
|---|---|---|
| 5,134,327 A | 7/1992 | Sumi et al. |
| 5,530,307 A | 6/1996 | Horst |
| 5,751,077 A | 5/1998 | Gonzalez |
| 5,924,847 A * | 7/1999 | Scaringe ................. F04D 25/06 417/42 |
| 5,959,382 A * | 9/1999 | Dauwalter .......... F16C 32/0493 310/12.14 |
| 6,043,583 A | 3/2000 | Kurosawa et al. |
| 6,437,471 B1 * | 8/2002 | Ogawara ................ H02K 7/085 310/156.04 |
| 7,129,608 B2 * | 10/2006 | Eppler ..................... H02K 5/08 310/216.074 |
| 2003/0146671 A1 | 8/2003 | Diehl et al. |
| 2004/0012294 A1 * | 1/2004 | Rippel ..................... H02K 1/20 310/60 A |
| 2004/0190250 A1 * | 9/2004 | Iijima ................. F04D 13/0673 361/697 |
| 2004/0245863 A1 | 12/2004 | Hong et al. |
| 2006/0208686 A1 * | 9/2006 | Takada ..................... H02P 6/10 318/801 |
| 2007/0262668 A1 * | 11/2007 | Brisson ............... F16C 32/0468 310/90.5 |
| 2008/0115527 A1 | 5/2008 | Doty et al. |
| 2010/0171383 A1 | 7/2010 | Petrov et al. |

OTHER PUBLICATIONS

Extended European Search Report for European Application No. EP10855430 mailed Nov. 5, 2014.

* cited by examiner

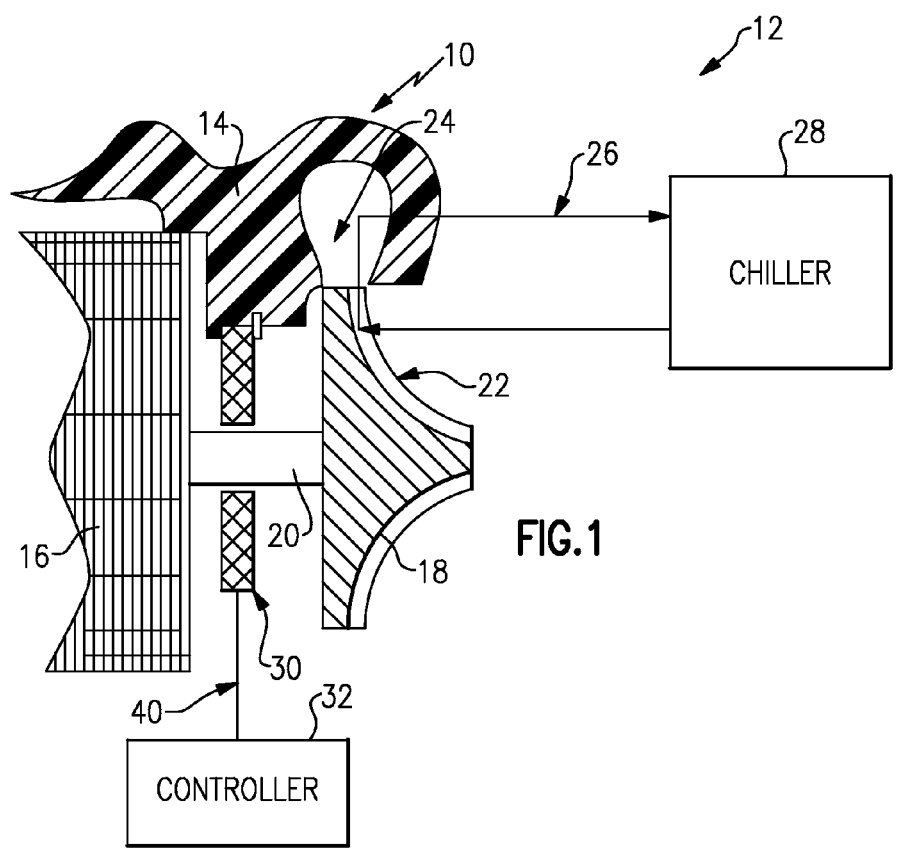
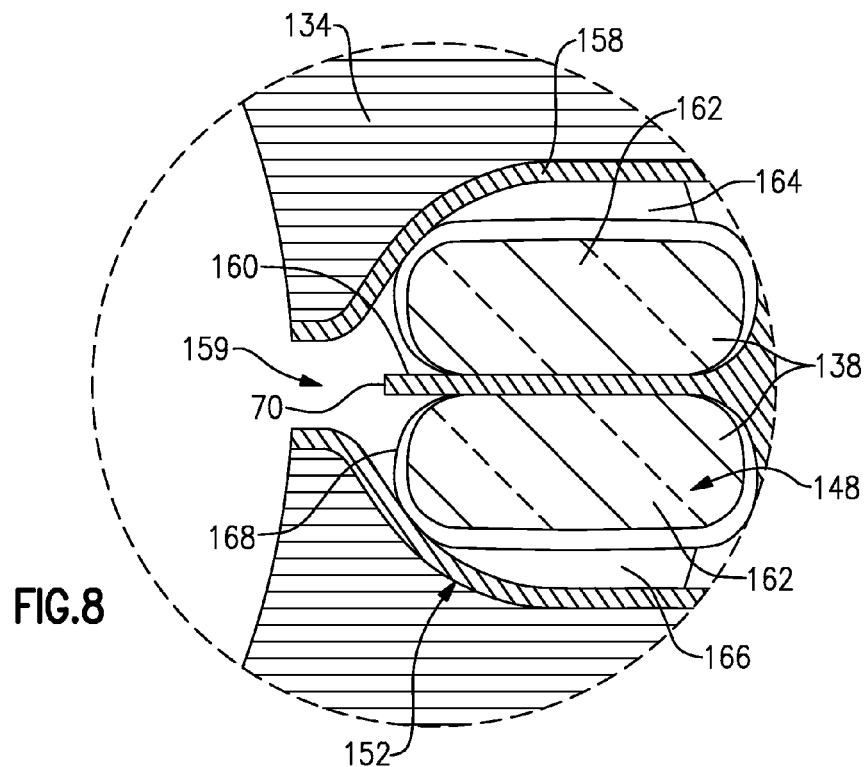

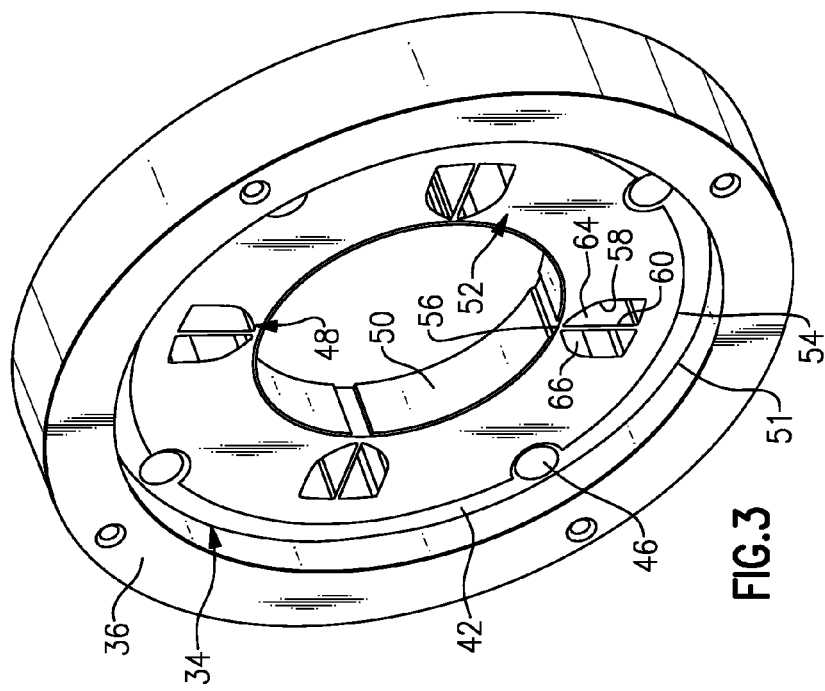
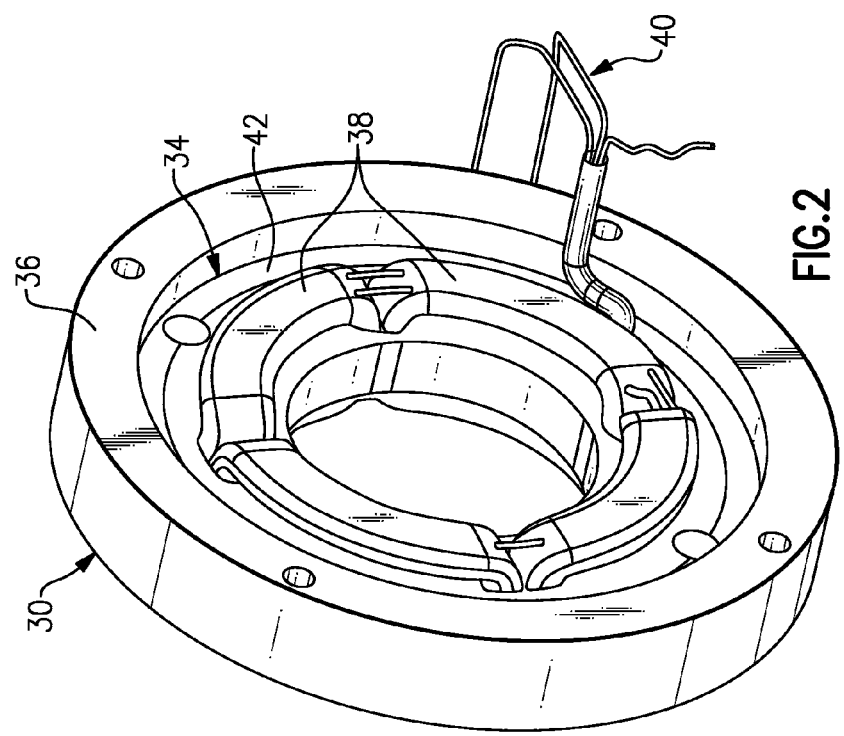

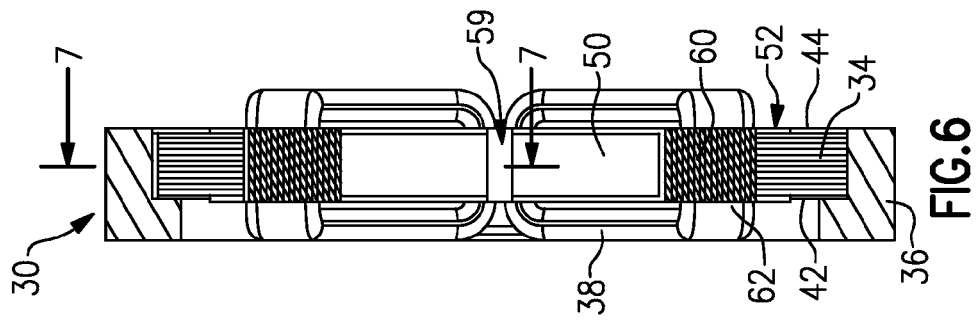
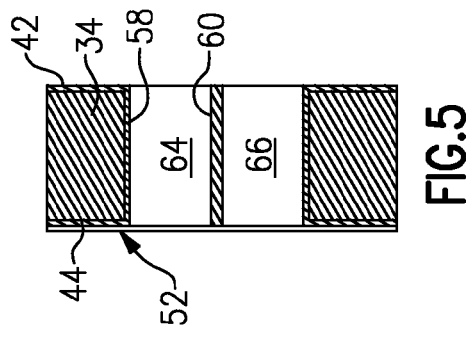
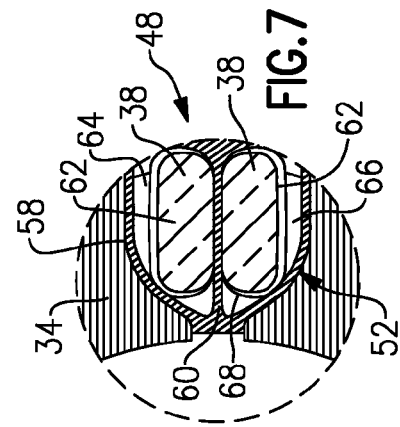
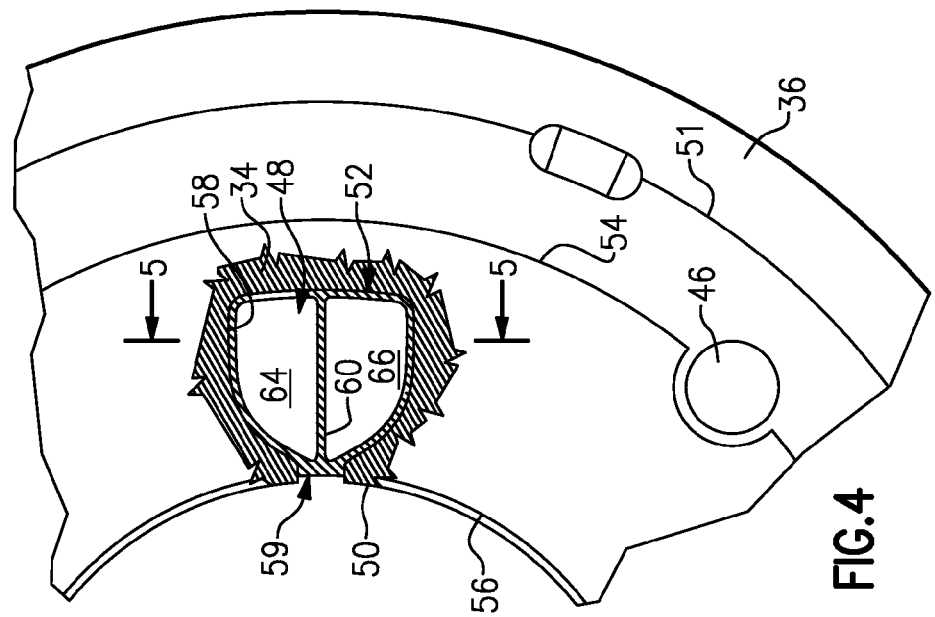

REFRIGERANT COMPRESSOR MAGNETIC BEARING

BACKGROUND

This disclosure relates to a refrigerant compressor magnetic bearing, and more particularly, to insulation for use in connection with the magnetic bearing.

One type of refrigerant compressor includes a magnetic bearing that rotationally supports a shaft. The shaft supports an impeller that is driven by an electric motor. The magnetic bearing assembly is supported in the compressor housing. In one type of magnetic bearing assembly, a lamination stack includes coils. A ring mounted in the housing supports the lamination stack.

The coils must be insulated from one another and the lamination stack. Typically, discrete insulation sheets, like NOMEX sheets, are cut to a desired shape and placed on either side of the laminate stack. The coils pass through coil apertures in the laminate stack. NOMEX insulating sheets are also arranged within the coil apertures and between the coils, which is labor intensive and tedious.

SUMMARY

A magnetic bearing assembly includes a lamination stack with coil apertures extending between opposing sides. A continuous unitary insulation layer is overmoulded onto the opposing sides and within the coil apertures providing a coil aperture lining. The insulation layer includes a wall within the coil aperture adjoining coil aperture lining and bisecting the coil aperture into first and second openings. A coil portion is disposed in each of the first and second openings and electrically isolated from one another by the wall. The magnetic bearing assembly is arranged in a refrigerant compressor that includes an electric motor rotationally configured to rotationally drive an impeller via a shaft. A controller is in communication with the magnetic bearing and configured to energize the coils and provide a magnetic field rotationally supporting the shaft.

BRIEF DESCRIPTION OF THE DRAWINGS

The disclosure can be further understood by reference to the following detailed description when considered in connection with the accompanying drawings wherein:

FIG. 1 is a highly schematic view of a refrigerant system having a refrigerant compressor with a magnetic bearing.

FIG. 2 is a perspective view of an example magnetic bearing assembly.

FIG. 3 is a perspective view of an insulated lamination stack supported within a ring.

FIG. 4 is an enlarged, partially broken view of a portion of the insulated lamination stack.

FIG. 5 is a cross-sectional view of the insulated lamination stack taken along line 5-5 in FIG. 4.

FIG. 6 is a cross-sectional view of the magnetic bearing assembly shown in FIG. 2.

FIG. 7 is an enlarged, cross-sectional view of the magnetic bearing assembly taken along line 7-7 in FIG. 6.

FIG. 8, is an enlarged, cross-sectional view similar to FIG. 7 depicting an alternate arrangement.

DETAILED DESCRIPTION

Referring to FIG. 1, a refrigeration system 12 includes a refrigerant compressor 10 for circulating a refrigerant. The refrigerant compressor 10 includes a housing 14 within which an electric motor 16 is arranged. The electric motor 16 rotationally drives an impeller 18 via a shaft 20 to pump the refrigerant.

The impeller 18 includes an inlet 22 and an outlet 24 in fluid communication with a refrigerant loop 26 that circulates the refrigerant to a load, such as a chiller 28. The refrigerant loop 26 also includes a condenser, an evaporator, and an expansion device (not shown).

The shaft 20 is rotationally supported relative to the housing 14 by a radial magnetic bearing assembly 30. A controller 32 communicates with the magnetic bearing assembly 30 to energize the magnetic bearing assembly 30, creating a magnetic field supporting the shaft 20, and control its characteristics during operation of the refrigerant compressor 10.

One type of magnetic bearing assembly 30 is shown in more detail in FIGS. 2 and 6. The magnetic bearing assembly 30 includes an annular lamination stack 34 supported within a ring 36. The ring 36 is mounted in the housing 14. Coils 38 cooperate with the magnetic stack 34 to generate a magnetic field in the air gaps between the stack and the shaft 20. In the example, four circumferentially spaced coils 38 are mounted onto the lamination stack 34. Leads 40 electrically connect the coils 38 to the controller 32, best shown in FIG. 1.

It is desirable to insulate the coils 38 from one another and the lamination stack 34 to prevent electrical shorts within the magnetic bearing assembly 30. The lamination stack 34 includes coil apertures 48 that extend between opposing sides 42, 44 of the lamination stack 34 to permit the coils 38 to pass between the opposing sides 42, 44. Rather than use discrete NOMEX sheets to insulate the coils 38 from one another and the lamination stack 34, the lamination stack 34 is overmoulded with an insulation 52. The insulation 52, which is adhered to the lamination stack 34 during the overmoulding process, may be constructed from polyphenolin sulfide or PEEK, for example. The insulation 52 is selected to provide good moulding and insulation characteristic as well as resistance to refrigerant.

The lamination stack 34 includes an inner diameter 50 within which the shaft 20 is arranged and an outer diameter 51 engaging the ring 36. In the example shown, the insulation 52 does not necessarily need to extend about or enclose the entire exterior of the lamination stack 34. Rather, the insulation 52 is moulded about portions of the opposing sides 42, 44 near the inner diameter 50 beneath the coils 38.

In one example, a gap 59 in the inner diameter 50 interconnects with the coil apertures 48, as shown in FIGS. 3 and 4. The insulation 52 includes an outer periphery 54 that is located radially inwardly from the outer diameter 51. In one example, the outer periphery 54 extends circumferentially between cooling holes 46, which are in fluid communication with the refrigerant loop 26. The insulation 52 extends radially inwardly from the outer periphery 54 to an inner periphery 56, which terminates slightly radially outward from the inner diameter 50. The insulation 52 is provided in the gap 59 and extends about the coil apertures 48 to provide a coil aperture lining 58 extending between the opposing sides 42, 44, best shown in FIG. 5. A wall 60 bisects the coil apertures 48 and interconnects opposing sides of the coil aperture lining 58 to provide first and second openings 64, 66, shown in FIGS. 4, 5 and 7.

Referring to FIG. 7, adjoining coil portions 62 from the coils 38 are provided in each of the first and second openings 64, 66. The wall 60 insulates the coil portion 62 from one another. The coil aperture lining 58, as well as a portion of the insulation 52 extending between the outer and inner peripheries 54, 56, insulates the coils 38 from the lamination stack 34. It may be desirable to provide tape 68 on the portions of the coil portions 62 facing one another to provide further insulation between the coil portions 62.

Another embodiment is shown if FIG. 8. Like numerals indicate like elements. Adjoining coil portions 162 from the coils 138 are provided in each of the first and second openings 164, 166 of the coil aperture 148. The wall 160, which insulates the coil portion 162 from one another, terminated in a terminal end 70 in or in proximity to the gap 159. The opening provided between the terminal end 70 and the coil aperture lining 158 interconnects the first and second openings 164, 166 and facilitates assembly of the coils 138 into the lamination stack 134. The coil aperture lining 158, as well as a portion of the insulation 152 extending between the outer and inner peripheries 154, 156, insulates the coils 138 from the lamination stack 134. It may be desirable to provide tape 168 on the portions of the coil portions 162 facing one another to provide further insulation between the coil portions 162.

Although an example embodiment has been disclosed, a worker of ordinary skill in this art would recognize that certain modifications would come within the scope of the claims. For that reason, the following claims should be studied to determine their true scope and content.

What is claimed is:

1. A refrigerant compressor comprising:
an electric motor configured to rotationally drive an impeller via a shaft;
a magnetic bearing assembly including an inner diameter within which the shaft is disposed, the magnetic bearing assembly having a lamination stack with coil apertures extending between opposing sides of the lamination stack, a continuous unitary insulation layer provided within the coil apertures and the opposing sides, and coils disposed within and extending between the coil apertures, wherein the insulation layer provides a coil aperture lining within each coil aperture and a wall formed entirely by the coil aperture lining within each coil aperture, wherein each wall bisects a respective coil aperture into first and second openings, and wherein the coils are disposed within and extend between the coil apertures; and
a controller in communication with the magnetic bearing and configured to energize the coils and provide a magnetic field rotationally supporting the shaft.

2. The refrigerant compressor according to claim 1, comprising a housing within which the electric motor and impeller are arranged, and a ring supporting the magnetic bearing assembly in the housing.

3. The refrigerant compressor according to claim 2, wherein the lamination stack includes an outer diameter engaging the ring, and the insulation layer includes an outer periphery arranged radially inward of the outer diameter and beneath the coils.

4. The refrigerant compressor according to claim 1, wherein the coil apertures include a gap facing radially inward providing a break at the inner diameter, and the insulation layer filling the gap with the coil aperture lining.

5. The refrigerant compressor according to claim 1, comprising a refrigerant loop in fluid communication with the impeller, and wherein the lamination stack includes cooling holes extending between the opposing sides which are in fluid communication with the refrigerant loop.

6. A magnetic bearing assembly comprising:
a lamination stack with coil apertures extending between opposing sides of the lamination stack;
a continuous unitary insulation layer arranged on the opposing sides and within each of the coil apertures providing a coil aperture lining, and providing a wall formed entirely by the coil aperture lining within each of the coil apertures, wherein each wall bisects a respective coil apertures into first and second openings; and
a coil portion disposed in each of the first and second openings, wherein coils are disposed within and extend between the coil apertures.

7. The magnetic bearing assembly according to claim 6, wherein the insulation layer includes an outer periphery arranged radially inward of an outer diameter of the lamination stack and beneath the coils.

8. The magnetic bearing assembly according to claim 6, wherein the coil apertures include a gap facing radially inward providing a break at an inner diameter of the lamination stack, and the insulation layer filling the gap with the coil aperture lining.

9. The magnetic bearing assembly according to claim 8, wherein the wall extends from the gap radially outward to an opposite portion of the coil aperture lining.

10. The magnetic bearing assembly according to claim 7, wherein cooling holes are circumferentially spaced about the lamination stack and extend between the opposing sides, the insulation including an outer periphery that extends radially to the cooling holes.

11. The magnetic bearing assembly according to claim 7, comprising a ring engaging the outer diameter.

12. The magnetic bearing assembly according to claim 7, wherein the coil apertures include a gap facing radially inward providing a break at an inner diameter of the lamination stack, and the wall terminates in a terminal end in proximity to the gap providing an opening in the insulation interconnecting the first and second openings.

13. A bearing stack comprising:
magnetic layers laminated to one another providing an annular body having opposing sides, and including multiple coil apertures circumferentially spaced about the annular body and extending between the opposing sides; and
a continuous unitary insulation layer arranged on the opposing sides and within the coil apertures, the continuous unitary insulation layer providing a coil aperture lining and a wall within each coil aperture, wherein each wall is formed entirely by the coil aperture lining and bisects a respective coil aperture into first and second openings.

14. The bearing stack according to claim 13, wherein the coil apertures include a gap facing radially inward providing a break at an inner diameter of the annular body, and the insulation layer filling the gap with the coil aperture lining.

15. The bearing stack according to claim 14, wherein the wall extends from the gap radially outward to an opposite portion of the coil aperture lining.

16. The bearing stack according to claim 13, comprising cooling holes circumferentially spaced about the annular body and extending between the opposing sides, the insulation including an outer periphery that extends radially to the cooling holes.

17. The bearing stack according to claim 13, wherein the coil apertures include a gap facing radially inward providing a break at an inner diameter of the lamination stack, and the wall terminates in a terminal end in proximity to the gap providing an opening in the insulation interconnecting the first and second openings.

* * * * *

UNITED STATES PATENT AND TRADEMARK OFFICE
CERTIFICATE OF CORRECTION

PATENT NO. : 9,624,939 B2
APPLICATION NO. : 13/640771
DATED : April 18, 2017
INVENTOR(S) : Lin Sun and Alain Pepin It is certified that error appears in the above-identified patent and that said Letters Patent is hereby corrected as shown below:

In the Claims

In Claim 1, Column 3, Line 47; after "magnetic bearing" insert --assembly--

In Claim 17, Column 5, Line 3; before "lamination" replace "the" with --a--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*